UNITED STATES PATENT OFFICE.

WILLIAM N. RINGER, OF PALACIOS, TEXAS.

REMEDY FOR ECZEMA.

No. 925,947.          Specification of Letters Patent.          Patented June 22, 1909.

Application filed February 4, 1908. Serial No. 414,156.

*To all whom it may concern:*

Be it known that I, WILLIAM N. RINGER, citizen of the United States, residing at Palacios, in the county of Matagorda and State of Texas, have invented certain new and useful Improvements in Remedies for Eczema, of which the following is a specification.

My invention relates to new and useful improvements in medical compounds and more particularly to a remedy for eczema, and other skin diseases of a like nature.

The object of the invention is to produce the compound in the form of a lotion which may be readily applied to the affected parts. Further, by the use of said compound to kill the disease germ and to effect a permanent cure, thus preventing the reappearance of the disease.

The compound is prepared from what is known as "medico ferno" (*Pteridium aquilinum*) which has a leaf about six inches long and resembles the ordinary pot fern, except that its leaves are more narrow; "boot weed" (*Verbena xutha*), which has a leaf rough and of a color resembling the mulberry leaf, but its shape is almost exactly like a beech leaf; and "black shank" (*Ratibida columnaris*), which has a leaf about five inches long with a slender stem having small lobe leaves on each side. The stalk grows about three feet in height and has joints four to five inches long and a black circle at these joints. These herbs or weeds, grow only in river bottoms, and on land that is high enough never to become swamped or marshy.

In forming the lotion, the ingredients of the compound are proportioned as follows:

Black shank _____ 1 ounce.
Boot weed _____ 1 ounce.
Medico ferno _____ 1 ounce.

The roots of the plants are ground and an ounce of each taken and the mass thoroughly mixed together to form a pulp. This pulp is boiled in about a pint of water until a strong liquid is produced, the essence of each root being fully extracted. It is then strained and the liquid thus had, allowed to cool, thereby producing the lotion.

The lotion is applied to the affected parts, and allowed to stand until it is thoroughly dry. Under ordinary conditions the lotion is applied three times a day, however in severe cases more applications, daily, may be required. Upon the first few applications of the lotion, the patient experiences an itching and burning sensation, but after three or four applications its effect is not painful and the itching or burning sensation is entirely removed. Subsequent applications have no painful effect upon the patient and each application assists in healing the affected parts, so that in two or three weeks a permanent cure is effected, except in extreme cases where the disease has been standing for years. In these cases a little longer time is required.

The lotion is put into suitable receptacles so that it may be readily handled and dispensed.

What I claim, is:

A medical compound consisting of an aqueous decoction, of the mixture of the roots of *Pteridium Aquilinum*, *Verbena xutha* and *Ratibida columnaris* substantially in the proportions specified.

In testimony whereof I have signed my name to this specification in the presence of two subscribing witnesses.

WILLIAM N. RINGER.

Witnesses:
   THEO. G. BRITTON,
   WM. A. CATHEY.